W. S. Pelham.
Corn Planter.
No. 94,910. Patented Sep. 14, 1869.

Witnesses
A. Ruppert
O. F. Clausen

Inventor
W. S. Pelham
D. C. Holloway & Co.
Atty

United States Patent Office.

W. S. PELHAM, OF KIRKVILLE, IOWA.

Letters Patent No. 94,910, dated September 14, 1869.

IMPROVEMENT IN HAND CORN-PLANTERS.

The Schedule referred to in these Letters Patent and making part of the same.

*To all whom it may concern:*

Be it known that I, W. S. PELHAM, of Kirkville, Wapello county, Iowa, have invented a new and useful Improvement in Hand Corn-Planter; and I do hereby declare that the following is a full and exact description thereof, reference being had to the accompanying drawings, and to the letters marked thereon.

Figure 1:
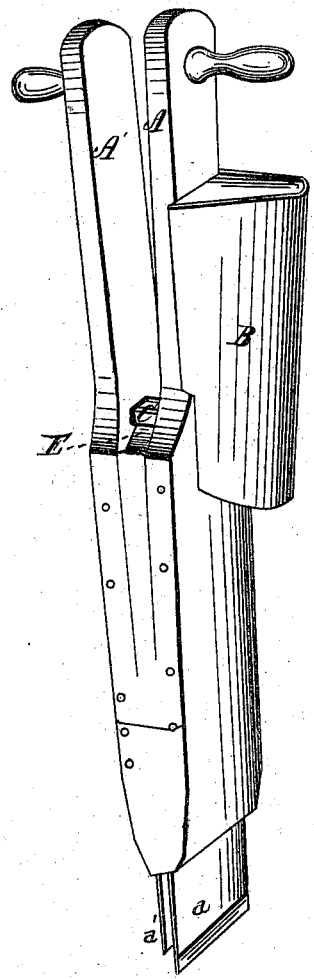

Figure 1 is a perspective view of the planter.

Figure 2:
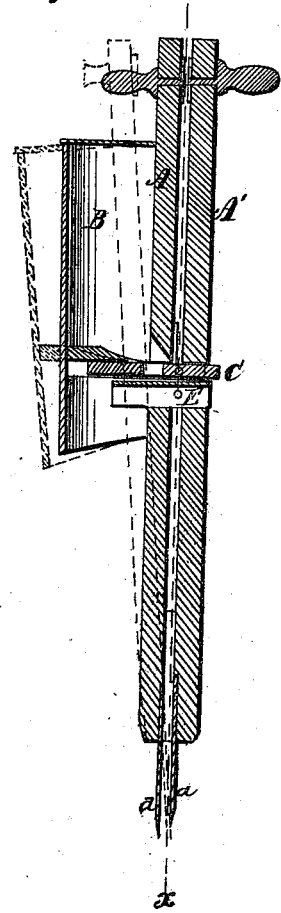

Figure 2, a sectional elevation.

Figure 3:
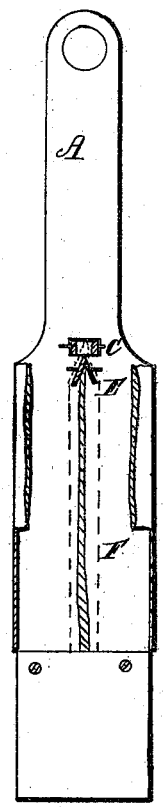

Figure 3, a sectional elevation on line $x\ x$ of fig. 2.

Figure 4:
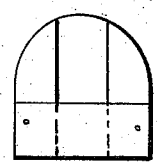

Figure 4, a bottom view of the concave bottom of the box.

Figure 5:

Figure 5, a section of the same.

The same letters indicate like parts in the several figures.

My invention relates to hand corn-planters; and

My improvement consists in the combination and arrangement of the seed-slide, scatterer, and flexible partition for keeping the kernels separated.

To enable those skilled in the art to make and use my invention, I will proceed to describe its construction and operation.

A A' represent the side pieces, which are hinged together near their lower ends, where they are provided with blades, $a\ a'$, and having handles near their upper ends.

B, the seed-box, attached to one of the side pieces.

C, the seed-slide, which is attached to the other side piece, entering under the bottom of the seed-box, and delivering the seed in measured quantities into the lower portion of the planter.

D, a piece of India rubber, serving as a brush.

The above brief reference to these several parts of the planter will be sufficient to an understanding of the case, they forming no part of my invention, and being similar in construction to other planters.

E represents a $\wedge$-shaped piece of sheet-metal, one end of which is to be secured to the side piece A', directly under the seed-slide, while its other end passes through a $\wedge$-shaped slot in the side piece A. It is to be of sufficient length to remain in this slot when the side pieces are furthest apart. As the seed leaves the slide it will fall on this scatterer, which distributes the kernels on each side of it.

F represents a flexible partition, extending from the scatterer down to the blades. Its office is to keep the seed, which has been scattered, separated until it can be deposited in the ground.

In planting corn, the kernels to be deposited in each hill should be a little scattered. Devices for accomplishing this have been employed in planters heretofore, but have proved to be ineffective, for the reason that the scatterer was some distance below the slide, so that if the operator did not keep the planter in a perfectly vertical position, all the seed would fall on one side of the scatterer. Mine, being placed directly under the slide, remedies this defect, and the scattered seed is kept separated by a partition until it is deposited.

Having thus described my invention,

What I claim, and desire to secure by Letters Patent, is—

The combination and arrangement of seed-slide C, scatterer E, and flexible partition F, substantially as and for the purpose set forth.

In testimony whereof, I have signed my name to this specification, in the presence of two subscribing witnesses.

W. S. PELHAM.

Witnesses:
F. L. McNAIR,
M. E. S. RUBEL.